Dec. 8, 1942.   V. W. KRAUSE   2,304,576
EYEGLASS STRUCTURE
Filed Nov. 21, 1941
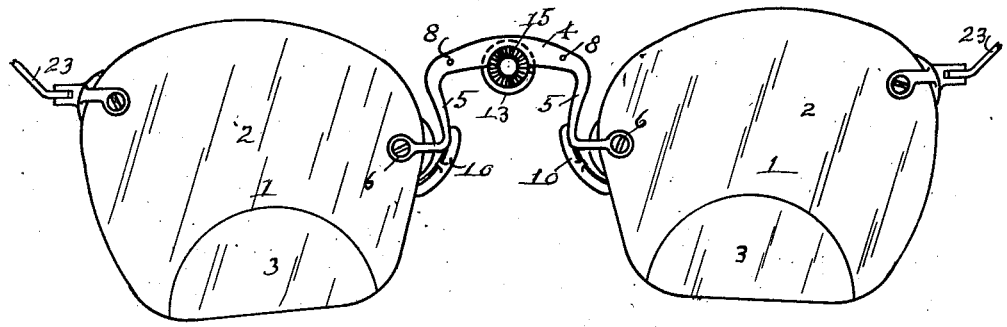
Fig. 1.
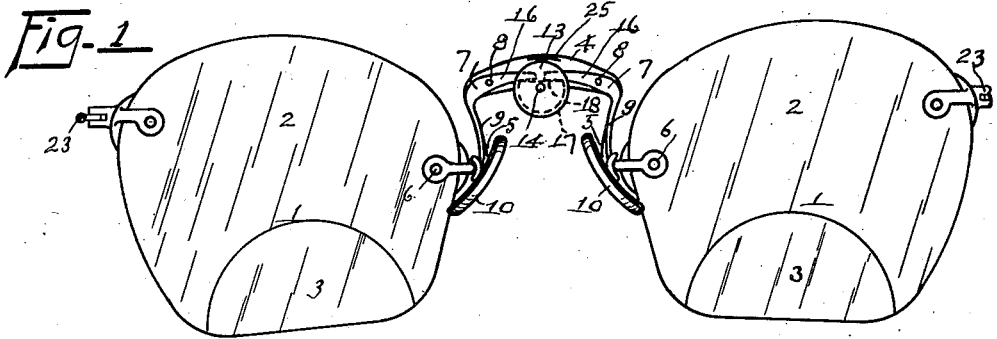
Fig. 2.
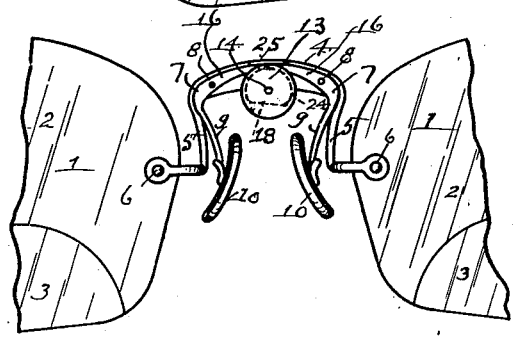
Fig. 3.
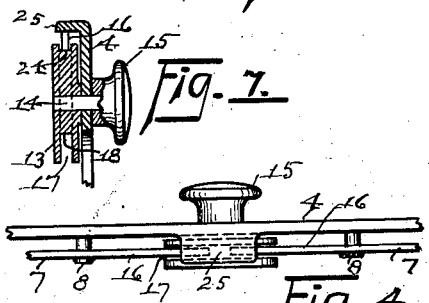
Fig. 7.
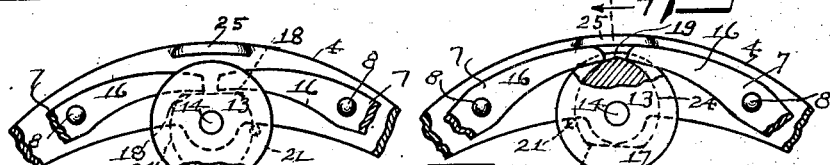
Fig. 4.
Fig. 5.   Fig. 6.
Witness:
Geo L. Chapel
Inventor
Victor W. Krause
By Rice and Rice
Attorneys Patented Dec. 8, 1942

2,304,576

UNITED STATES PATENT OFFICE 2,304,576

EYEGLASS STRUCTURE

Victor W. Krause, Rockford, Mich., assignor of one-third to Harold R. Farrell, Rockford, Mich., and one-third to Ernest A. Shellman, Grand Rapids, Mich.

Application November 21, 1941, Serial No. 419,813

3 Claims. (Cl. 88—49)

The present invention relates to eyeglass structures, particularly bifocal eyeglasses having upper and lower lenses, and which include a pair of glasses, a bridge connecting the same, a pair of members mounted on the bridge for relative movement toward and from each other to vary the distance between their parts which engage the wearer's nose at comparatively wider or narrower portions thereof, and rotatable means on the bridge engaging said members for moving the same to adjusted position; and its object is to provide improved means for maintaining said members against accidental displacement from said rotatable means.

This and any other and more specific objects hereinafter appearing are attained by, and this invention finds preferable embodiment in, the illustrative structure particularly described in the body of this specification and illustrated by the accompanying drawing, in which:

Figure 1 is a front view of an eyeglass structure embodying my invention;

Figure 2 is a rear view thereof;

Figure 3 is a rear view of middle parts of the structure similar to Figure 2 but showing the parts in another position;

Figure 4 is a top plan view (enlarged) of said middle parts;

Figures 5 and 6 are rear views (enlarged) of said middle parts (partially broken away) showing the same in different positions;

Figure 7 is a sectional view of the same taken on line 7—7 of Figure 6.

The eyeglass structure illustrated by the drawing includes a pair of bifocal glasses 1 having upper and lower lenses 2, 3 for distant vision and near or reading vision respectively, these glasses being connected by a U-shaped yoke or bridge 4 whose downwardly extending legs 5 are fastened to the edge portions of the glasses by any suitable means as the screws 6 passing therethrough and through the bifurcated extremities of these legs. A pair of members are mounted on the rear side of the bridge for relative turning movement toward and from each other, these members as illustrated being levers 7 fulcrumed on the bridge by pivot pins 8 threaded thereinto. The lower arms 9 of the levers have parts, the pads 10, adapted to engage the opposite sides respectively of the wearer's nose for supporting the structure thereon, these pads being desirably mounted for universal pivotal movement on the arms.

An element, the cam wheel 13, is rotatably mounted on the rear side of the bridge, its pivot pin 14 extending through the bridge and having at its front end a knob handle 15 for rotating said element. This element has a deep circumferential groove 17 whose bottom 24 extending eccentrically of the pivot pin 14 forms a rotatable cam having an extended flat low section 18 and an opposite high point 19.

The mutually approaching upper arms 16 of the levers 7, extending between the opposite sides of said groove, operatively bear on its cam bottom so that, when the knob 15 is manually turned to rotate the element 13 to the position shown in Figures 2 and 5, the levers' upper arms 16 may engage on said extended flat low section 18 in which position the levers' lower arms 9 may spread apart in order that their pads 10 will engage a comparatively wider (and lower) portion of the wearer's nose thus supporting the structure at a comparatively low level suitable for distant vision through the upper lenses 2; but, when the element 13 is turned clockwise in Figure 6 to carry the high point 19 of the cam slightly "beyond center," i. e., beyond vertical line 7—7 as seen in Figure 6, the levers' upper arms 16 are raised and their lower arms 9 are made to approach each other to the position wherein the structure is supported at a comparatively higher level suitable for near or reading vision through the lower lenses 3. In this position the levers' upper arms 16, as best seen in Figure 6, rest on the cam bottom of the groove at opposite sides of its high point 19 which extends radially only slightly. Either of the opposite turning movements of the element 13 is limited by its stop 21 engaging the bridge at the right or left hand side of the pivot pin 14 as shown in Figures 5 and 6.

The bridge has on its rear side a rather long stop member 25 which extends over the upper edges of the levers' upper arms 16 lying in the rotatable element groove 17. This stop member is so closely spaced from the circular periphery of said element as to prevent said arms from being accidentally moved outwardly from the groove 17.

Temple bows 23 for the glasses may be provided for additionally or more securely supporting the structure. The bridge and levers are desirably made of metal bendable into set forms for adjusting the structure to the requirements of individual wearers.

The present invention is an improvement over that described and claimed in my pending application, Serial No. 381,231, filed March 1, 1941.

This invention being intended to be pointed out in the claims, is not to be limited to or by details of construction of the particular embodiment thereof illustrated by the drawings or hereinbefore described.

I claim:

1. In an eyeglass structure of the class described which includes a pair of glasses and a bridge connecting the same, a pair of levers mounted on the bridge for relatively turning movement toward and from each other to vary the distance between their hereinafter mentioned pads and having lower arms with pads adapted to engage opposite sides respectively of the wearer's nose for supporting the structure thereon at comparatively wider and narrower portions thereof, a manually rotatable element extending axially forwardly-rearwardly on the bridge having a circumferential groove with an eccentric cam bottom operatively engaging the levers' upper arms for turning the levers to adjusted position, and a stop on the bridge extending over the levers' upper arms lying in the groove and so closely spaced relatively to said element's periphery as to hold said upper arms against accidental displacement from the groove.

2. In an eyeglass structure of the class described which includes a pair of glasses and a bridge connecting the same, a pair of levers mounted on the bridge for relatively turning movement toward and from each other to vary the distance between their hereinafter mentioned pads and having lower arms with pads adapted to engage opposite sides respectively of the wearer's nose for supporting the structure thereon at comparatively wider and narrower portions thereof, a manually rotatable element extending axially forwardly-rearwardly on the bridge having a circumferential groove with an eccentric cam bottom operatively engaging the levers' upper arms for turning the levers to adjusted position, and a stop on the bridge extending over the levers' upper arms lying in the groove and so closely spaced relatively to said element's periphery as to hold said upper arms against accidental displacement from the groove, said cam bottom having an extended comparatively flat low section whereon said upper arms bear in their lowermost position and an opposite high point lying between the mutually adjacent extremities of the upper arms in their highest operative position, and said element having a stop member engaging the bridge for limiting said element's turning movement in either direction.

3. In an eyeglass structure of the class described which includes a pair of glasses and a bridge connecting the same, a pair of levers mounted on the bridge for relatively turning movement toward and from each other to vary the distance between their hereinafter mentioned pads and having lower arms with pads adapted to engage opposite sides respectively of the wearer's nose for suporting the structure thereon at comparatively wider and narrower portions thereof, a manually rotatable element extending axially forwardly-rearwardly on the bridge having a circumferential groove with an eccentric cam bottom operatively engaging the levers' upper arms for turning the levers to adjusted position, and a stop on the bridge extending over the levers' upper arms lying in the groove and so closely spaced relatively to said element's periphery as to hold said upper arms against accidental displacement from the groove, said cam bottom having an extended comparatively flat low section whereon said upper arms bear in their lowermost position.

VICTOR W. KRAUSE.